(12) United States Patent
Le Quere

(10) Patent No.: US 9,341,803 B2
(45) Date of Patent: May 17, 2016

(54) DEVICE FOR CONNECTING TOGETHER TUBES FOR PROTECTING AN OPTICAL FIBER CABLE, A SEGMENT OF AN OPTICAL TRANSMISSION CIRCUIT INCLUDING SUCH A DEVICE, AND A SEALING ELEMENT FOR SUCH A DEVICE

(75) Inventor: Philippe Le Quere, Betton (FR)

(73) Assignee: Parker Hannifin Manufacturing France SAS, Ville-la-Grand, Annemasse (FR)

( * ) Notice: Subject to any disclaimer, the term of this patent is extended or adjusted under 35 U.S.C. 154(b) by 559 days.

(21) Appl. No.: 13/696,408

(22) PCT Filed: May 11, 2011

(86) PCT No.: PCT/EP2011/057634
§ 371 (c)(1),
(2), (4) Date: Jan. 2, 2013

(87) PCT Pub. No.: WO2011/141517
PCT Pub. Date: Nov. 17, 2011

(65) Prior Publication Data
US 2013/0142492 A1    Jun. 6, 2013

(30) Foreign Application Priority Data

May 11, 2010   (FR) ..................................... 10 53687
Nov. 24, 2010  (FR) ..................................... 10 59694

(51) Int. Cl.
*G02B 6/44* (2006.01)
*F16L 37/091* (2006.01)

(52) U.S. Cl.
CPC ............. *G02B 6/4459* (2013.01); *F16L 37/091* (2013.01); *G02B 6/4464* (2013.01)

(58) Field of Classification Search
CPC .... G02B 6/4459; G02B 6/4464; F16L 37/091
See application file for complete search history.

(56) References Cited

FOREIGN PATENT DOCUMENTS

| EP | 0 363 188 A1 | 11/1990 |
|----|--------------|---------|
| EP | 1 818 702 A1 | 8/2007  |

OTHER PUBLICATIONS

International Search Report, and English translation attached, in corresponding International Application No. PCT/EP2011/057634 dated Jul. 1, 2011.

*Primary Examiner* — Ryan Lepisto
*Assistant Examiner* — Erin Chiem
(74) *Attorney, Agent, or Firm* — Renner, Otto, Boisselle & Sklar, LLP

(57) ABSTRACT

A device (1) for connecting together tubes (101, 102) for protecting an optical fiber cable (103), the device comprising a tubular body (2) defining a channel (3) having a first housing (4.1) and a second housing (4.2) each arranged to receive one of the tubes and provided with means (5) for sealed retention of said tube, and an annular step (9) extending between the housings to form an abutment against penetration of the tubes into the housings, an annular sealing element (10) being arranged in the first housing beside a flank of the step and being arranged to be taken, under the effect of axial compression exerted by the tube, from a first state in which the sealing element defines a section through which the cable can pass freely to a second state in which the sealing element defines a section less than a section of the cable. A segment, of an optical transmission circuit including such a connection device.

26 Claims, 3 Drawing Sheets

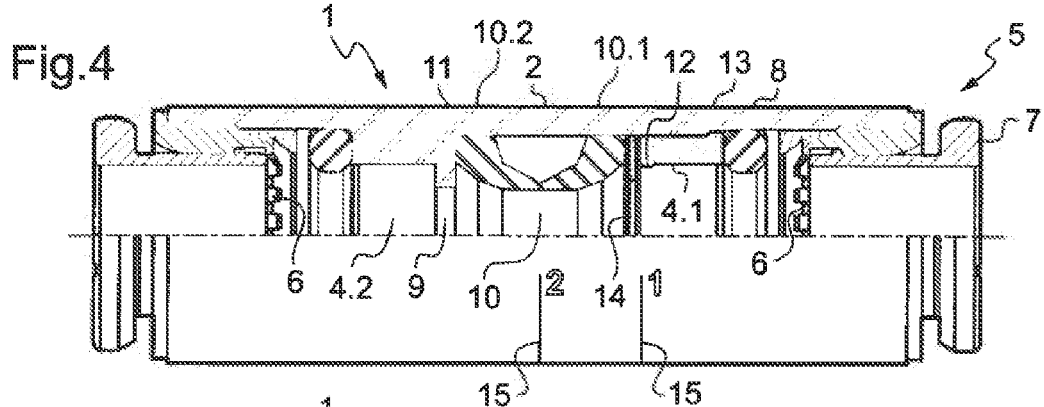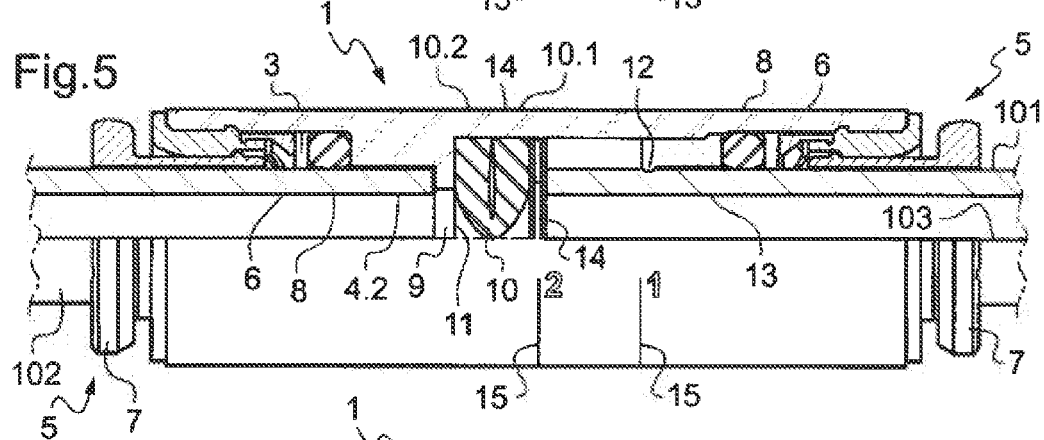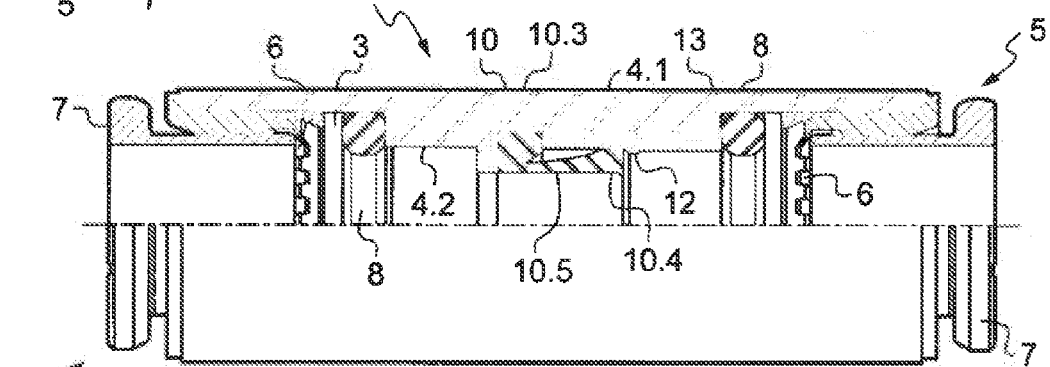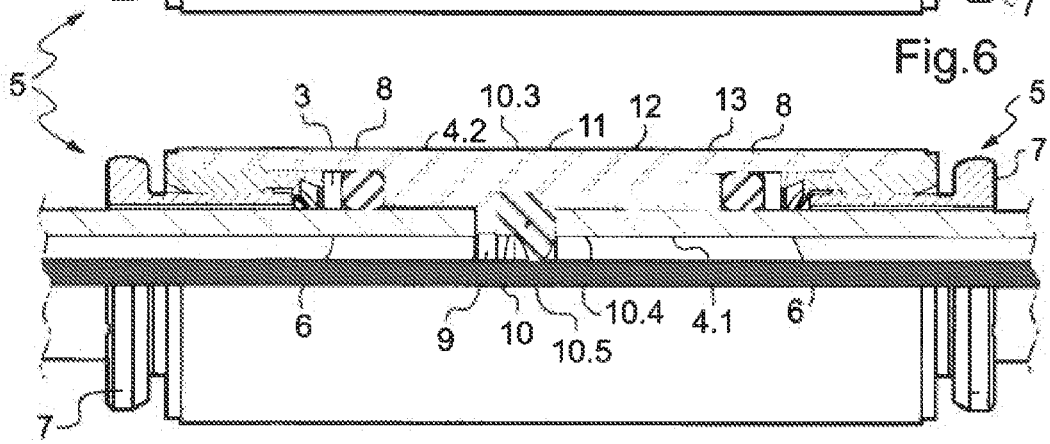

DEVICE FOR CONNECTING TOGETHER TUBES FOR PROTECTING AN OPTICAL FIBER CABLE, A SEGMENT OF AN OPTICAL TRANSMISSION CIRCUIT INCLUDING SUCH A DEVICE, AND A SEALING ELEMENT FOR SUCH A DEVICE

FIELD OF INVENTION

The present invention relates to a device for connecting together tubes for protecting an optical fiber cable, and to a segment of an optical transmission circuit including such a device. The invention also provides a sealing element that is particularly adapted to such a device.

BACKGROUND

An optical transmission circuit comprises an optical fiber cable received in protective tubes that are connected to one another by connection devices. The installation of such a circuit begins by laying and connecting together tubes in which the optical fiber cable is to be inserted using air pressure so that the cable is pushed along the tubes by the air. The connection devices therefore need to present two states: an insertion state in which the optical fiber cable is allowed to pass freely, and a utilization state in which the connection devices isolate the tubes they connect together by leaktight sealing around the optical fiber cable.

Document US-A-2007/200344 discloses a device for connecting together optical fiber cable protection tubes, the device comprising a tubular body defining a channel having a first end housing and a second end housing, each of which housings is arranged to receive one of the tubes and is provided with means for retaining said tubes in sealed manner. The bodies include an annular step extending between the housings so as to form an abutment against penetration of the tubes into the housings. An annular sealing element is arranged in the first housing in the vicinity of a frustoconical flank of the step. The sealing element has a rest state in which the sealing element defines a free section through which the cable can pass. While the tube is being pushed into the first housing, the tube forces the sealing element into the constriction defined inside the channel by the annular step, thereby deforming the sealing element into a second state in which the sealing element defines a section that is less than the section of the cable. Forced engagement of the sealing element into the constriction of the channel requires the user to apply significant force while inserting the tube into the first housing. In addition, the sealing element behaves randomly while it is being engaged in the constriction. That makes it difficult for the operator to determine whether the tube has been pushed in sufficiently to obtain the desired deformation of the sealing element. It is difficult to dimension the sealing element and the constriction in the channel, and it is also difficult to select the material for the sealing element. Finally, those connections are not reusable, since the sealing element remains in its second state after the tubes have been withdrawn.

SUMMARY OF THE INVENTION

An object of the invention is to provide an improved connection device.

To this end, the invention provides a device for connecting together tubes for protecting an optical fiber cable, the device comprising a tubular body defining a channel having a first end housing and a second end housing, each arranged to receive one of the tubes and provided with means for retaining said tube in sealed manner. The body includes an annular step extending between the housings in order to form an abutment to penetration of the tubes into the housings, and the device includes an annular sealing element that is arranged in the first housing in the vicinity of a flank of the step and that is deformable from a first state in which the sealing element defines a free section for passing the cable, and a second state in which the sealing element defines a section that is smaller than a section of the cable. The sealing element is arranged to be taken into its second state under the effect of axial compression, and the first housing is arranged to so that the tube can compress the annular sealing element axially against the step.

The sealing element is deformed against the step without penetrating therein. Deformation is thus obtained in direct manner by the action of the tube, thereby making it possible to simplify design for the purposes of limiting the force needed for deforming the sealing element and of making it easier for the operator to perceive that the tube has been properly pushed in. The deformation of the sealing element is reversible, such that, if necessary, it is possible to disconnect the tubes and subsequently to reconnect them without taking action on the sealing element.

Preferably, the body includes a portion in relief arranged in the first housing on a side of the sealing element remote from the step and arranged to form an abutment that the tube can pass in such a manner that the tube in abutment against the portion in relief leaves the sealing element in its first state, while the tube that has gone past the portion in relief is capable of compressing the annular sealing element axially against the step.

This makes it easier for the operator to tell when a tube has been pushed incorrectly and makes use of the connection device more secure.

Advantageously, the body is made of a transparent material and includes indications representative of penetration as far as the portion in relief and full penetration of the tube into the first housing.

The operator can thus inspect penetration of the tubes visually.

In a first particular embodiment of the sealing element, the sealing element comprises two annular walls having their inner circumferences connected together and their outer circumferences spaced apart from each other and preferably presents a cross-section that is V-shaped or U-shaped.

The structure of the sealing element is thus particularly simple and the deformation of the sealing element to its second state requires only a relatively small amount of axial compression force to be exerted.

In a second particular embodiment of the sealing element, the sealing element comprises a stationary portion bearing against the step and a movable portion connected to the stationary portion by a tubular web arranged to deform inwards when the movable portion is moved towards the stationary portion and, preferably, the movable portion has an outer diameter that is less than the inner diameter of a chamber in the stationary portion so as to be capable of penetrating into said chamber.

Axial compression of the sealing element can be obtained by exerting a relatively small force.

The invention also provides a segment of an optical transmission circuit comprising an optical fiber cable extending in two tubes connected to a connection device of the above-defined type.

The invention also provides an annular sealing element deformable from a first state in which the sealing element defines a large through section and a second state in which the sealing element defines a small through section. The sealing element is arranged to be taken into its second state under the effect of axial compression and to deform in its second state along a sinuous annular line.

This mode of deformation enables deformation of large amplitude to be obtained while ensuring that the sealing element in its second state is pressed firmly against the optical fiber cable in the above-envisaged application.

Other characteristics and advantages of the invention appear on reading the following description of particular, non-limiting embodiments of the invention.

BRIEF DESCRIPTION OF THE DRAWINGS

Reference is made to the accompanying drawings, in which:

FIGS. 4 and 5 are views analogous to FIG. 1 of a connection device in a second embodiment, respectively before connection of the tubes and in the utilization state;

FIGS. 6 and 7 are views analogous to FIG. 1 of a connection device in a third embodiment, respectively before connection of the tubes and in the utilization state;

DETAILED DESCRIPTION

Figure 1:
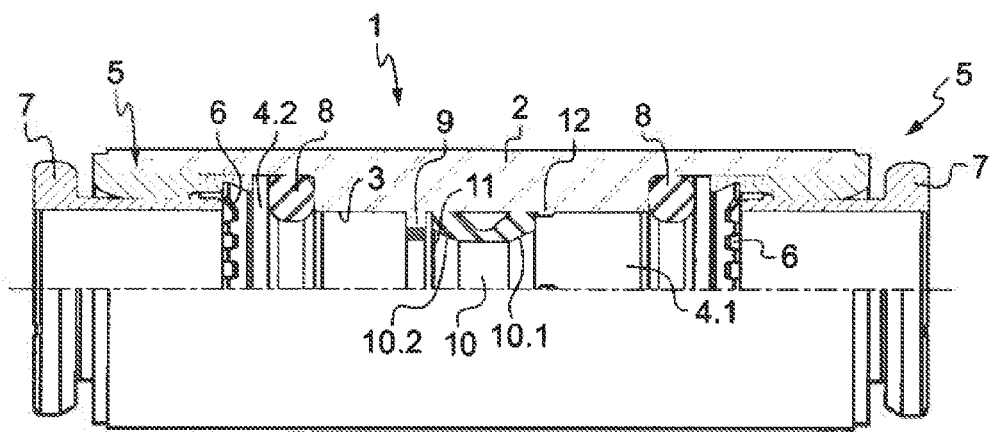
FIG. 1 is a longitudinal half-section view of a connection device in accordance with a first embodiment of the invention, prior to connecting the tubes.

With reference to the figures, the connection device of the invention, given overall reference 1, is for connecting together protection tubes 101 and 102 for protecting an optical fiber cable 103, the optical fiber cable extending inside the tubes 101 and 102 through the connection device 1.

The connection device 1 comprises a tubular body 2 defining a channel 3 having a first end housing 4.1 and a second end housing 4.2, which housings are arranged to receive the tubes 101 and 102. Each of the housings 4.1 and 4.2 is provided with means given overall reference 5 for retaining said tube in sealed manner. The sealing retaining means 5 in this example comprise a deformable washer 6 having a toothed inner circumference for biting into the outside surface of the tube, a disconnection pusher 7, and a sealing element 8 for gripping the outside surface of the tube 101, 102. The structure and the arrangement of the sealing retaining means 5 are themselves known and are not described in greater detail herein. The use of a toothed deformable washer is advantageous since it enables the tube to be held without moving back the tube.

The body 2 includes an annular step 9 projecting into the channel 3 between the housings 4.1 and 4.2 in order to form an abutment to penetration of the tubes 101 and 102 into the housings 4.1 and 4.2.

An annular sealing element 10 is placed in the first housing 4.1 in the vicinity of a radial flank 11 of the step 9. The sealing element 10 is deformable from a first state in which the sealing element 10 defines a free section for passing the cable 103, to a second state in which the sealing element 10 defines a section smaller than a section of the cable 103. The sealing element 10 is arranged to be taken into its second state under the effect of an axial compression force.

The first housing 4.1 is arranged so that the tube 101 can compress the annular sealing element 10 axially against the step 9.

Figure 2:
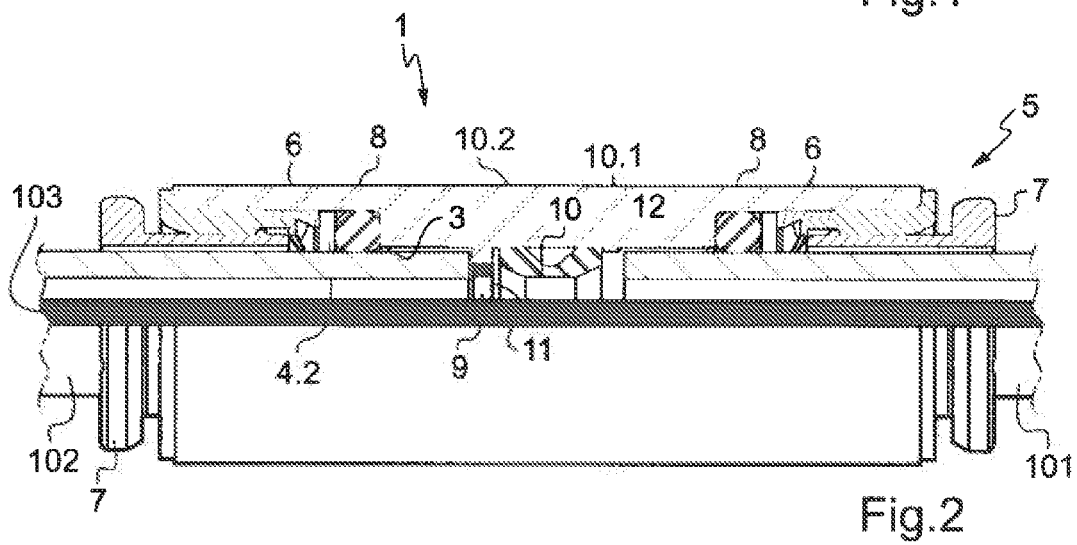
FIGS. 2 and 3 are views analogous to FIG. 1, the connection device being shown respectively in its insertion state and in its utilization state with the tubes connected.
Figure 3:
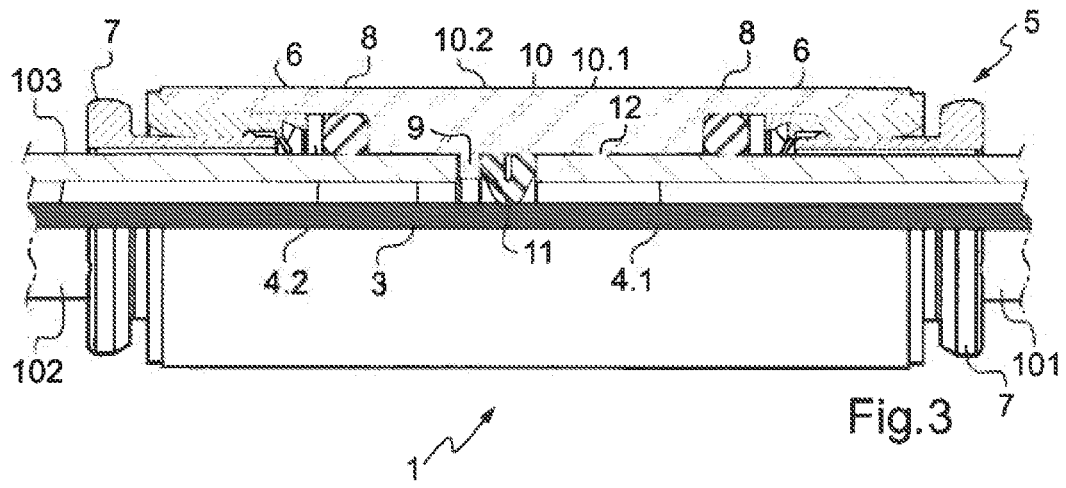

With reference to FIGS. 1 to 3 and in accordance with the first embodiment, the body 2 includes a portion in relief 12 arranged in the first housing 4.1 on a side of the sealing element 10 remote from the step 9 and arranged to form an abutment that the tube 101 can pass so that the tube 101 in abutment against the portion in relief 12 leaves the sealing element 10 in its first state. The portion in relief 12 is made integrally with the body 2. The tube 101 can go past the portion in relief 12 because of its low height and by elastic deformation.

The sealing element 10 has two annular walls 10.1 and 10.2 with inner circumferences connected to each other and outer circumferences that are spaced apart from each other. The walls 10.1 and 10.2 are spaced apart from each other so as to define a V-shaped cross-section when the sealing element 10 is in its first state, and they are in contact with each other when the sealing element is in its second state. It can be understood that in this second state, the walls extend radially and conserve the same length such that the through section defined by the sealing element 10 is much less than that which it defines in the first state.

In order to install the cable 103, the tubes 101 and 102 are inserted into the housings 4.1 and 4.2 so as to form a circuit within which the cable 103 is to extend. The tube 101 is pushed in as far as the portion in relief 12 and the tube 102 as far as the step 9 (FIG. 2). The sealing elements 8 then provide sealing for the connection and the washers 6 prevent the tubes 101 and 102 from moving back out. The cable 103 is subsequently inserted in an end tube of the circuit and air under pressure is also injected into the tube to push the cable along the tubes and through the connection devices.

Once the cable 103 is in place, each tube 101 is pushed beyond the portion in relief 12 to compress the sealing element 10 axially and take it to its second state in which the sealing element 10 clamps onto the cable 103 (FIG. 3).

It should be observed that the walls 10.1 and 10.2 are defined by surfaces that flare towards the outer circumference so as to obtain good stability for the sealing element 10 in its second state.

Elements that are identical or analogous to those described above with reference to the first embodiment are given the same numerical references in the description below of two other embodiments.

With reference to FIGS. 4 and 5, and in the second embodiment, the through section in the sealing element 10 while in its first state is much greater than the through section in the sealing element 10 while in its second state.

The walls 10.1 and 10.2 are spaced very widely apart from each other and they are of relatively long length. It can be observed that the walls 10.1 and 10.2 include a bend increasing the empty space that extends between them.

The portion in relief 12 in this embodiment is secured to a bushing 13 fitted in the first housing 4.1.

In this embodiment, a push ring 14 is interposed between the sealing element 10 and the portion in relief 12 (and thus the bushing 13) to serve as a piston and to facilitate axially compressing the sealing element 10. This is particularly advantageous when, as in this embodiment, the tube 101 has an outer diameter that is less than the outer diameter of the sealing element 10.

The body 2 is made of a transparent material and includes marks 15 representing penetration of the tube 101 as far as the portion in relief 12 and its full penetration into the first housing 4.1.

With reference to FIGS. 6 and 7 and in the third embodiment, the sealing element 10 comprises a stationary portion 10.3 bearing against the step 9 and a movable portion 10.4 connected to the stationary portion 10.3 by a tubular web 10.5 arranged to deform inwardly when the movable portion 10.4 moves closer to the stationary portion 10.3. The movable portion 10.4 has an outer diameter smaller than an inner diameter of a setback in the stationary portion 10.3 so as to be capable of penetrating into the setback (FIG. 7) when the sealing element 10 is in its second state.

The bushing 13 has an end that extends beyond the portion in relief 12 so that the stationary portion 10.3 is held captive between the bushing 13 and the step 9, and the movable portion 10.4 is received slidably in said end of the bushing 13.

The operation of these connection devices is identical to that of the first embodiment.

Figure 8:
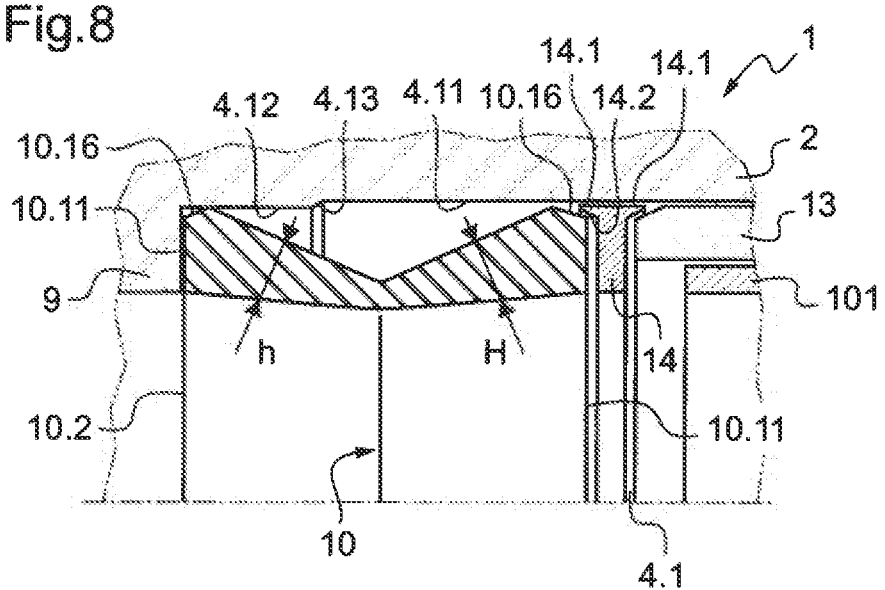
FIG. 8 is a perspective view of a sealing element in accordance with the invention, in its first state.
Figure 9:
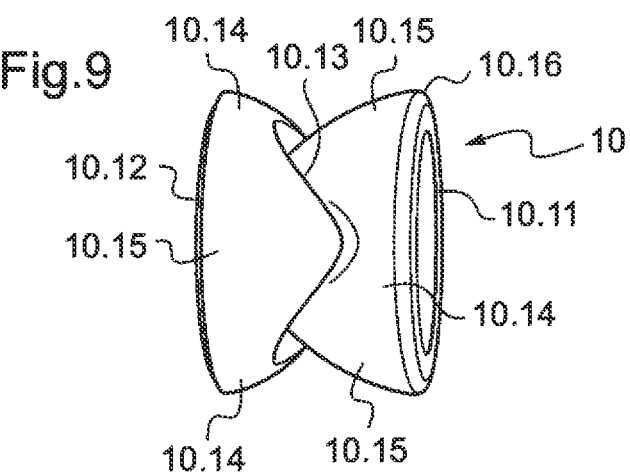
FIG. 9 is a fragmentary section view of a device in a variant embodiment, fitted with said sealing elements, in its second state.

In the variant embodiment of FIGS. 8 and 9, the sealing element 10 is arranged as above in the first housing 4.1 in the vicinity of a radial flank 11 of the step 9. The sealing element 10 has one end 10.11 beside the bushing 13 and an opposite end 10.12 beside the step 9. The sealing element 10 is deformable from a first state in which the sealing element 10 defines a free section for passing the cable 103, to a second state in which the sealing element 10 defines a section that is smaller than a section of the cable 103. The sealing element 10 is arranged to be taken to its second state under the effect of an axial compression force.

The sealing element 10 has the shape of a tubular diabolo that is arranged to deform into its second state along a sinuous annular line 10.13.

The sealing element 10 has portions 10.14 and 10.15 of different stiffnesses that are arranged in two axially opposite groups each arranged at one end of the sealing element. These portions comprise portions 10.14 of smaller stiffness alternating with portions 10.15 of greater stiffness on each side of the sealing element. Thus, each smaller stiffness portion 10.14 in one of the groups faces a greater stiffness portion 10.15 of the other group.

It can be seen in FIG. 9 that the smaller stiffness portions 10.14 are of thickness h that is less than the thickness H of the greater stiffness portions 10.15.

In this embodiment, a push ring 14 is mounted in the first housing 4.1 on the side the sealing element 10 that is remote from the step 9. The push ring 14 is mounted to be axially movable in the housing 4.1 in order to lie between the tube 101 and the sealing element 10 so as to act as a piston and facilitate axial compression of the sealing element 10. This is particularly advantageous specifically when as in this embodiment, the tube 101 has an outer diameter that is less than the outer diameter of the sealing element 10.

The push ring 14 has an outer rim 14.1 projecting axially so as to penetrate between the wall of the body 2 defining the first housing 4.1 and an outer portion 10.16 beside the end 10.11 of the sealing element 10. The push ring 14 in this embodiment is symmetrical and actually has two outer rims 14.1 extending from opposite faces of the push ring 14 so as to avoid mounting errors.

Each outer rim 14.1 has a frustoconical inside surface 14.2 and the outer portion 10.6 of the sealing element 10 has a complementary frustoconical shape.

When the push ring 14 is pressed against the sealing element 10 under the force of inserting the tube 101, the push ring 14 separates the outer portion 10.16 from the wall of the body 2 so as to facilitate moving the outer portion 10.16, thereby causing the sealing element 10 to be compressed axially and thus deformed into its second state. During compression, each greater stiffness portion 10.15 faces a smaller stiffness portion 10.14, thereby creating deformation along a sinuous annular line.

By separating the outer portion 10.16 from the wall it is possible to limit the forces needed for deforming the sealing element 10 into its second state.

In order to make this deformation even easier, the first housing 4.1 has a first segment 4.11 and a second segment 4.12 freely receiving in slidable manner the outer portions 4.16 of the ends 10.11 and 10.12 respectively. The first segment 4.11 also freely receives the push ring 14 to move in translation, and the second segment 4.12, which extends close to the step 9, has diameter that is less than that of the first segment 4.11. Sealing is provided by contact between the outer portion 10.16 of the end 10.12 and the wall of the second segment 4.12 of the housing 4.1. The first segment 4.11 is connected to the second segment 4.12 of the first housing 4.1 by a shoulder 4.13 forming an abutment against axial movement of the outer portion 10.16 of the end 10.11, thereby limiting the compression of the sealing element 10.

This also makes it easier for the outer portion 10.16 to return to its initial position, and thus for the sealing element 10 to return to its first state, when the tube 101 is withdrawn.

Figure 10:
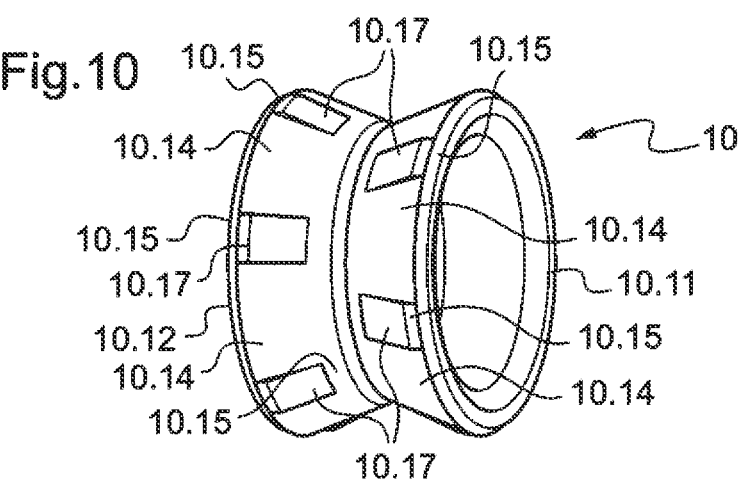
FIG. 10 is a perspective view of a sealing element in a variant embodiment, the sealing element being in its first state.

In the variant of FIG. 10, there can be seen in greater detail one particular embodiment in which the greater stiffness portions 10.15 include local reinforcement 10.17. The local reinforcement 10.17 is made, by way of example, in the form of an element of a material that is stiffer than the material of the body of the sealing element 10 and that is fitted onto the outside surface of the sealing element 10, or that is incorporated in the material of the body of the sealing element 10. The local reinforcement may also be in the form of a portion in relief. Conversely, the smaller stiffness portions 10.14 may incorporate respective local weakness elements, such as a recess or a layer of material of smaller stiffness than the remainder of the material of the sealing element 10.

Naturally, the invention is not limited to the embodiments described but covers any variant coming within the ambit of the invention as defined by the claims.

In particular, the sealing element may also have a cross-section that is U-shaped.

The step 9 and the abutment 12 may be interrupted or continuous.

The sealing retaining means may be of some other structure, and for example they may comprise a radially movable latch for blocking or releasing a portion in relief on the tube, or they may comprise a clamp.

What is claimed is:

1. A device for connecting together tubes for protecting an optical fiber cable, the device comprising:
    a tubular body defining a channel and having a first end housing and a second end housing, each arranged to receive a respective one of the tubes and provided with a retainer and a tube seal for retaining said tube in sealed manner, the body including an annular step located axially between the end housings; and
    an annular sealing element arranged in the first end housing and having a stationary portion bearing against the step and a movable portion connected to the stationary portion by an intermediate portion configured to deform radially inwardly when the movable portion is moved axially towards the stationary portion, whereby the annular sealing element is deformable under axial compression from a first state in which the annular sealing element defines a free section for passing the optical fiber cable, and a second state in which the annular sealing element defines a section that is smaller than the free section for sealing against the optical fiber cable.

2. A device according to claim 1, wherein the tubular body includes a portion in relief arranged in the first end housing on a side of the annular sealing element remote from the step and arranged to form an abutment that the tube can pass in such a manner that the tube in abutment against the portion in relief leaves the annular sealing element in its first state, while the tube that has gone past the portion in relief is capable of compressing the annular sealing element axially against the step.

3. A device according to claim 2, wherein the portion in relief is made integrally with the tubular body.

4. A device according to claim 2, wherein the portion in relief forms part of a bushing fitted in the tubular body.

5. A device according to claim 4, wherein a push ring is interposed between the bushing and the annular sealing element.

6. A device according to claim 1, wherein the stationary and movable portions of the annular sealing element are formed by respective annular walls having their inner circumferences connected together by the intermediate portion and their outer circumferences spaced apart from each other.

7. A device according to claim 6, wherein the annular sealing element has a cross-section that is V-shaped or U-shaped.

8. A device according to claim 6, wherein the annular walls are defined by surfaces that flare towards the outer circumference.

9. A device according to claim 1, wherein the intermediate portion is in the form of a tubular web arranged to deform radially inwards when the movable portion is moved towards the stationary portion.

10. A device according to claim 9, wherein the movable portion has an outer diameter that is less than the inner diameter of a chamber in the stationary portion so as to be capable of penetrating into said chamber.

11. A device according to claim 1, wherein the tubular body is made of a transparent material and includes indications representative of penetration as far as the portion in relief and full penetration of the tube into the first end housing.

12. A device according to claim 1, wherein the annular sealing element is arranged to deform into its second state along a sinuous annular line.

13. A device according to claim 12, wherein the annular sealing element includes axially opposite portions of different stiffnesses, portions of smaller stiffness alternating with portions of greater stiffness on each side of the sealing element.

14. A device according to claim 13, wherein the smaller stiffness portions are of thickness smaller than a thickness of the greater stiffness portions.

15. A device according to claim 13, wherein the greater stiffness portions include local reinforcement.

16. A device according to 1, wherein a ring is mounted to move axially in the first end housing of the tubular body so as to be interposed between the tube and the annular sealing element.

17. A device according to claim 16, wherein the ring includes an outer rim projecting axially so as to be inserted between the tubular body and a radially outer portion of the annular sealing element.

18. A device according to claim 17, wherein the outer rim has a frustoconical inside surface and the radially outer portion of the sealing element has a frustoconical shape.

19. A device according to claim 1, wherein the first end housing has a first segment for freely receiving an outer portion of the annular sealing element to move in translation, and in the vicinity of the step, a second segment for receiving an outer portion of the opposite end of the annular sealing element.

20. A device according to claim 19, wherein the first segment has a diameter greater than a diameter of the second segment and is connected to the second segment by a shoulder forming an abutment to movement in translation of the freely received outer portion.

21. A segment of an optical transmission circuit comprising an optical fiber cable extending in two tubes connected to a connection device in accordance with claim 1.

22. A device according to claim 1, wherein the annular sealing element is arranged to deform into its second state along a sinuous annular line.

23. A device according to claim 22, wherein the annular sealing element includes axially opposite portions of different stiffnesses, portions of smaller stiffness alternating with portions of greater stiffness on each side of the sealing element.

24. A device according to claim 23, wherein the smaller stiffness portions are of thickness smaller than a thickness of the greater stiffness portions.

25. A device according to 23, wherein the greater stiffness portions include local reinforcement.

26. A device for connecting a protective tube to an optical fiber cable, the device comprising:
   a tubular body defining a channel configured to receive the tube and provided with a retainer and a tube seal for retaining said tube in sealed manner, the body including an annular step; and
   an annular sealing element arranged in the first end housing and having a stationary portion bearing against the step and a movable portion connected to the stationary portion by an intermediate portion configured to deform radially inwardly when the movable portion is moved axially towards the stationary portion, whereby the annular sealing element is deformable under axial compression from a first state in which the annular sealing element defines a free section for passing the optical fiber cable, and a second state in which the annular sealing element defines a section that is smaller than the free section for sealing against the optical fiber cable.

* * * * *